UNITED STATES PATENT OFFICE.

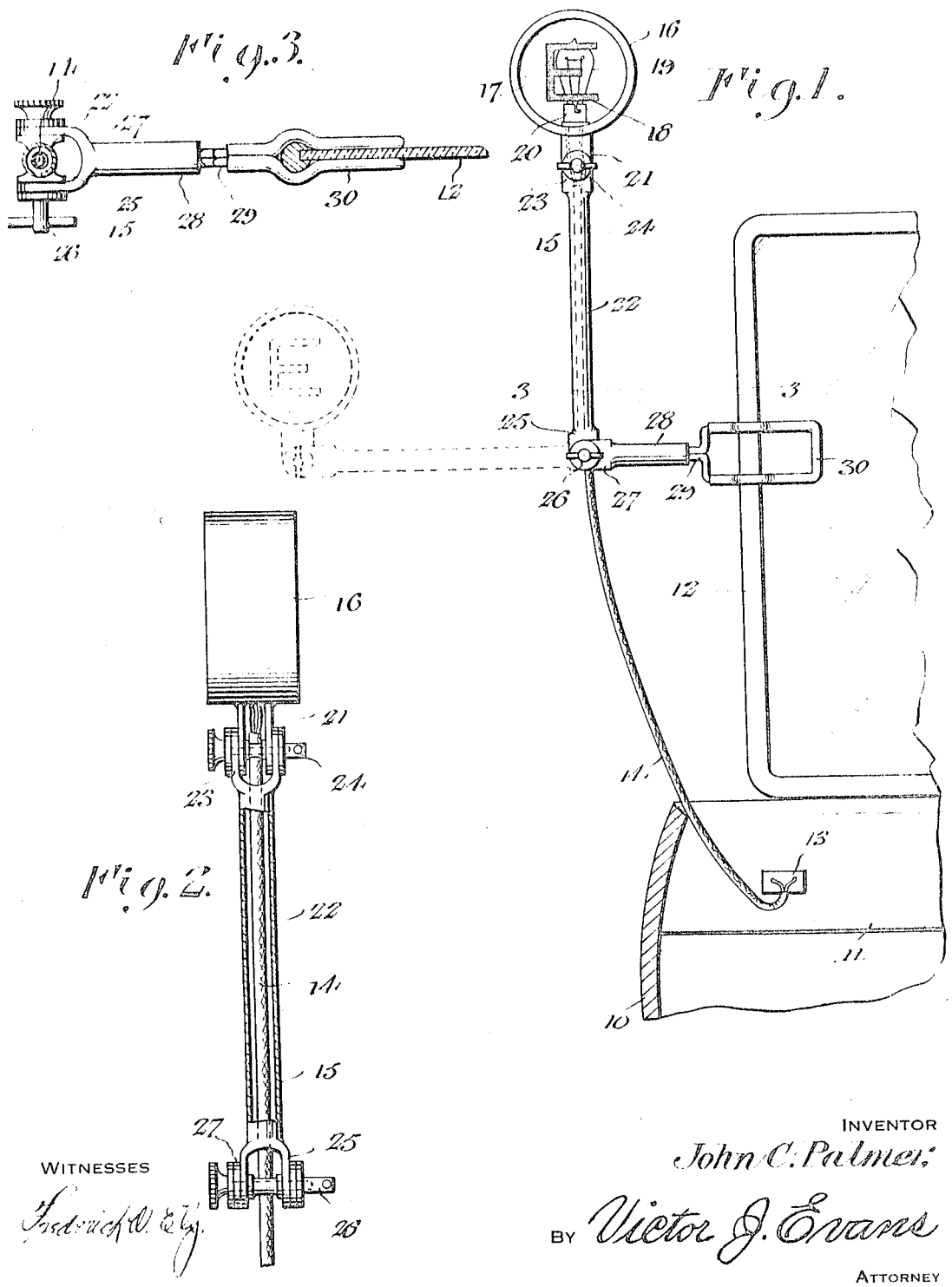

JOHN C. PALMER, OF PHILADELPHIA, PENNSYLVANIA.

VEHICLE-INDICATING DEVICE.

1,291,625.

Specification of Letters Patent.

Patented Jan. 14, 1919.

Application filed March 6, 1917. Serial No. 152,669.

*To all whom it may concern:*

Be it known that I, JOHN C. PALMER, a citizen of the United States, residing at 3914 Ludlow street, Philadelphia, in the county of Philadelphia and State of Pennsylvania, have invented new and useful Improvements in Vehicle-Indicating Devices, of which the following is a specification.

An object of the invention is to provide an indicator that can be preferably illuminated for the purpose of indicating a particular vehicle, so that the owner thereof, coming out of a hotel or theater, can readily discern the location of his automobile or other vehicle along the highway, or the curb of the street.

It is well known that automobiles jam up in front of a hotel or theater, and that ofttimes when the owner of the vehicle emerges from the place, he finds it very hard to locate his particular vehicle, and although there may be a chauffeur in charge, the chauffeur can not readily discern his employer among the crowds of people emerging from the theater or hotel.

To obviate this I provide an attachment for an automobile or other vehicle, which is in the nature of an adjustable indicator or sign, and which applied to the wind-shield or other part of a vehicle, can be arranged to show at a distance, so that the owner of the vehicle, or the porter calling for the vehicle in front of a hotel, can readily discern which vehicle is desired.

In the further disclosure of the invention, reference is to be had to the accompanying drawings, constituting a part of this specification, in which similar characters of reference denote corresponding parts in all the views, and in which—

Figure 1 is a fragmentary elevation of a part of an automobile showing dash and wind-shield, with my invention attached thereto, the dotted lines indicating the horizontal position of the device.

Fig. 2 is a fragmentary side elevation of the device, and

Fig. 3 is a horizontal sectional view taken on the line 3—3 of Fig. 1, showing the manner of securing the clamp on the wind-shield of the vehicle.

Referring more particularly to the views, 10 indicates an automobile having a dash 11 and the usual wind-shield 12. Most automobiles are equipped with electric circuits of various kinds for use in starting and lighting, and as shown in Fig. 1 there may be provided on the dash 11 suitable electrical connection or plug 13, for connecting a wire 14 used in conjunction with my device, the latter in its entirety being indicated by the numeral 15.

The device consists substantially of a circular casing or box 16, having its front and back 17 of glass, upon which a suitable monogram or letter 18 may be painted or otherwise depicted. An electric bulb 19 being suitably arranged within the casing and connected to a tubular socket 20, said bulb being also connected with the electric wires 14 which pass down through the tubular socket, the socket terminates in flattened bifurcated portions 21, and a tubular holder 22 through which the wires 14 pass has bifurcated portions 23, in which the bifurcated portions 21 fit, with a suitable thumb screw 24 passing through both bifurcated portions, as shown, so that the box or casing will be hinged upon the holder 22, and can be adjusted to different positions as is shown, for instance, in dotted lines of Fig. 1, the holder 22 has its lower extremity bifurcated as at 25, and similarly hinged thereto by a thumb screw 26, are the bifurcated portions 27 of a bracket 28, terminating at its inner end in a spring clamp 29, preferably having a rubber covering 30, the clamp being inserted over to fit and closely engage the wind-shield 12, so as to rigidly support the bracket 28 horizontally thereon, with the bracket projecting horizontally from one side of the wind-shield, as has been mentioned heretofore, the wires 14 connecting with the plug 13, and it will be seen that the device can now be adjusted to different positions, as shown in Fig. 1, so that the casing 16 will project beyond the general body or line of the vehicle, and can be seen at quite a distance up or down the street, being clearly apparent that the monogram, letter or numeral on the glass front and back of the casing will be illuminated by the light, so that the owner at a distance can distinguish his car, and have the same signaled to approach the hotel or theater, or can readily walk to the same.

It will of course be understood that when the vehicle is in motion or en route from one point to another, the device can readily be detached from the wind-shield and stowed away in the car until such time as it is desired to use the same, the device being small and compact so as to take up very little room when not in use.

Having described my invention, I claim:

1. A designating device for motor vehicles, the combination with the dash and wind shield of an automobile, of a bracket having connection at one end with the wind shield and projecting laterally there-beyond, a tubular holder hingedly connected with the free end of the bracket and adapted to be adjusted in parallelism or at right angles with respect to the shield, and an electric sign hingedly connected with the upper free end of the tubular holder, and electric wires passing through the tubular holder and connected at one end with the sign and at its opposite end with the dash of the vehicle.

2. A designating device for motor vehicles, the combination with a dash and wind shield of an automobile, of a bracket provided with a bifurcated free end and its opposite end having connection with the wind shield, a tubular holder having upper and lower bifurcated ends, a member passing through the bifurcated ends of the bracket and the lower bifurcated end of the holder adapting the holder to be swung in parallelism and at right angles with respect to the wind shield, a circular casing hingedly connected in the upper bifurcated ends of the tubular holder having an electric bulb therein, and electric wires passing through the tubular holder and having connection with the bulb and the dash of the vehicle.

In testimony whereof I affix my signature.

JOHN C. PALMER.